United States Patent
Hsu

(10) Patent No.: US 9,874,048 B1
(45) Date of Patent: Jan. 23, 2018

(54) BENDABLE DISPLAY APPARATUS AND SUPPORTING DEVICE

(71) Applicant: FIRST DOME CORPORATION, New Taipei (TW)

(72) Inventor: An-Szu Hsu, New Taipei (TW)

(73) Assignee: FIRST DOME CORPORATION, New Taipei (TW)

( * ) Notice: Subject to any disclaimer, the term of this patent is extended or adjusted under 35 U.S.C. 154(b) by 0 days.

(21) Appl. No.: 15/379,607

(22) Filed: Dec. 15, 2016

(51) Int. Cl.
  *E05D 11/10* (2006.01)
  *E05D 3/06* (2006.01)
  *E05D 7/00* (2006.01)
  *H05K 5/00* (2006.01)
  *H05K 5/02* (2006.01)
  *G06F 1/16* (2006.01)
  *E05D 3/12* (2006.01)

(52) U.S. Cl.
  CPC .......... *E05D 11/1028* (2013.01); *E05D 3/06* (2013.01); *E05D 3/122* (2013.01); *E05D 7/00* (2013.01); *G06F 1/1652* (2013.01); *G06F 1/1681* (2013.01); *H05K 5/0017* (2013.01); *H05K 5/0226* (2013.01); *Y10T 16/5474* (2015.01)

(58) Field of Classification Search
  CPC ....... E05D 11/1028; E05D 3/06; E05D 3/122; E05D 7/00; H05K 5/0017; H05K 5/0226; G06F 1/1681; G06F 1/1652; H04M 1/022; F16M 11/10; E05Y 2900/606; Y10T 16/541; Y10T 16/547; Y10T 16/5474; Y10T 16/5475; Y10T 16/5476

USPC .......... 16/354, 366, 368, 369, 370; 248/919; 379/433.13; 455/575.3; 361/679.27, 361/679.06
  See application file for complete search history.

(56) References Cited

U.S. PATENT DOCUMENTS

| | | | |
|---|---|---|---|
| 6,223,393 B1 * | 5/2001 | Knopf | G06F 1/1618 16/366 |
| 8,720,011 B1 * | 5/2014 | Hsu | E05D 3/122 16/354 |
| 8,971,032 B2 * | 3/2015 | Griffin | G06F 1/1616 345/156 |
| 9,506,279 B2 * | 11/2016 | Kauhaniemi | G06F 1/1652 |
| 9,562,380 B2 * | 2/2017 | Song | E05D 1/00 |
| 9,606,583 B2 * | 3/2017 | Ahn | G06F 1/1681 |
| 2014/0123436 A1 * | 5/2014 | Griffin | H04M 1/0216 16/221 |

(Continued)

*Primary Examiner* — William L Miller
(74) *Attorney, Agent, or Firm* — Li & Cai Intellectual Property (USA) Office

(57) ABSTRACT

A bendable display apparatus includes two supporting devices, a carrying plate, and a soft display mounted on the carrying plate. Each supporting device includes a hinge module and two buffering modules respectively installed on two opposite sides of the hinge module. Each buffering module includes an external linking member fixed on the hinge module, an internal linking member fixed on the carrying plate and being movable with respect to the external linking member, and a gear driven by the hinge module to move the internal linking member. Each hinge module is bendable between an unfolded position and an inwardly folded position. When the hinge module is bent from the unfolded position toward the inwardly folded position, the gear is driven by the hinge module to move the corresponding internal linking member away from the pivots.

20 Claims, 9 Drawing Sheets

(56) References Cited

U.S. PATENT DOCUMENTS

| | | | |
|---|---|---|---|
| 2015/0277506 A1* | 10/2015 | Cheah | G06F 1/1681 361/679.27 |
| 2016/0048174 A1* | 2/2016 | Hsu | G06F 1/1681 16/342 |
| 2016/0139634 A1* | 5/2016 | Cho | G06F 1/1652 361/679.27 |
| 2016/0147267 A1* | 5/2016 | Campbell | G06F 1/1681 361/679.27 |
| 2016/0202736 A1* | 7/2016 | Huang | G06F 1/1681 16/369 |
| 2016/0370828 A1* | 12/2016 | Hsu | G06F 1/1681 |
| 2016/0370829 A1* | 12/2016 | Hsu | G06F 1/1681 |
| 2017/0060188 A1* | 3/2017 | Han | G06F 1/1652 |
| 2017/0061836 A1* | 3/2017 | Kim | G09F 9/301 |

* cited by examiner

BENDABLE DISPLAY APPARATUS AND SUPPORTING DEVICE

BACKGROUND OF THE INVENTION

1. Field of the Invention

The instant invention relates to a display apparatus; in particular, to a bendable display apparatus and a supporting device.

2. Description of Related Art

When the conventional supporting device is inwardly bent, the total length of the hinge module of the conventional supporting device is not changed, so a plate mounted on an inner surface of the conventional supporting device is deformed because the bending radius of the plate is smaller than that of the hinge module so as to cause the hinge module to compress the plate. When a soft display mounted on the inner surface of the conventional supporting device is inwardly bent, the soft display is easily broken because the hinge module of the conventional supporting device compresses the soft display.

SUMMARY OF THE INVENTION

The instant disclosure provides a bendable display apparatus and a supporting device for effectively solving the problem caused by conventional supporting devices.

The instant disclosure provides a bendable display apparatus, comprising: two supporting devices each including: a hinge module including: a plurality of pivots parallel to each other and arranged in one row; and a plurality of torsion units sleeved at the pivots, wherein at least two positioning portions are respectively arranged on two opposite portions of the torsion units, and at least two driving portions are respectively arranged on two opposite portions of the torsion units; and two buffering modules respectively arranged at two opposite sides of the row of the pivots, respectively fixed on the at least two positioning portions, and respectively corresponding to the at least two driving portions, each of the two buffering modules including: an external linking member fixed on the corresponding positioning portion; an internal linking member movably disposed on the external linking member, wherein the internal linking member has at least one rack gear facing the external linking member; and at least one gear engaged with the at least one rack gear and the corresponding portion; wherein in each of the two supporting devices, the hinge module is bendable between an unfolded position and an inwardly folded position along at least one of the pivots, and the torsion units are configured to stop the hinge module at a desired position between the unfolded position and the inwardly folded position; when the hinge module is at the unfolded position, the supporting device is a flat construction; when the hinge module is at the inwardly folded position, the supporting device is a curved construction and the internal linking members are approximately arranged at the inner side of the curved construction; wherein in each of the hinge modules, when the hinge module is bent from the unfolded position toward the inwardly folded position, the at least one gear is driven by the corresponding driving portion to move the at least one rack gear of the internal linking member away from the pivots; a carrying plate fixed on the internal linking members of the two supporting devices; and a soft display mounted on the carrying plate.

The instant disclosure also provides a supporting device, comprising: a hinge module including: a plurality of pivots parallel to each other and arranged in one row; and a plurality of torsion units sleeved at the pivots, wherein at least two positioning portions are respectively arranged on two opposite portions of the torsion units, and at least two driving portions are respectively arranged on two opposite portions of the torsion units; and two buffering modules respectively arranged at two opposite sides of the row of the pivots, respectively fixed on the at least two positioning portions, and respectively corresponding to the at least two driving portions, each of the two buffering modules including: an external linking member fixed on the corresponding positioning portion; an internal linking member movably disposed on the external linking member, wherein the internal linking member has at least one rack gear facing the external linking member; at least one gear engaged with the at least one rack gear and the corresponding portion; wherein the hinge module is bendable between an unfolded position and an inwardly folded position along at least one of the pivots, and the torsion units are configured to stop the hinge module at a desired position between the unfolded position and the inwardly folded position; when the hinge module is at the unfolded position, the supporting device is a flat construction; when the hinge module is at the inwardly folded position, the supporting device is a curved construction and the internal linking members are approximately arranged at the inner side of the curved construction; wherein when the hinge module is bent from the unfolded position toward the inwardly folded position, the at least one gear is driven by the corresponding driving portion to move the at least one rack gear of the internal linking member away from the pivots.

In summary, when the hinge module is bent between the unfolded position and the inwardly folded position, the hinge module does not compress an object mounted on the supporting device (e.g., the soft display or the carrying plate) by moving the internal linking members with respect to the external linking members. Thus, when the supporting device supports the soft display, the soft display can be inwardly bent without suffering damage.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Figure 1A:
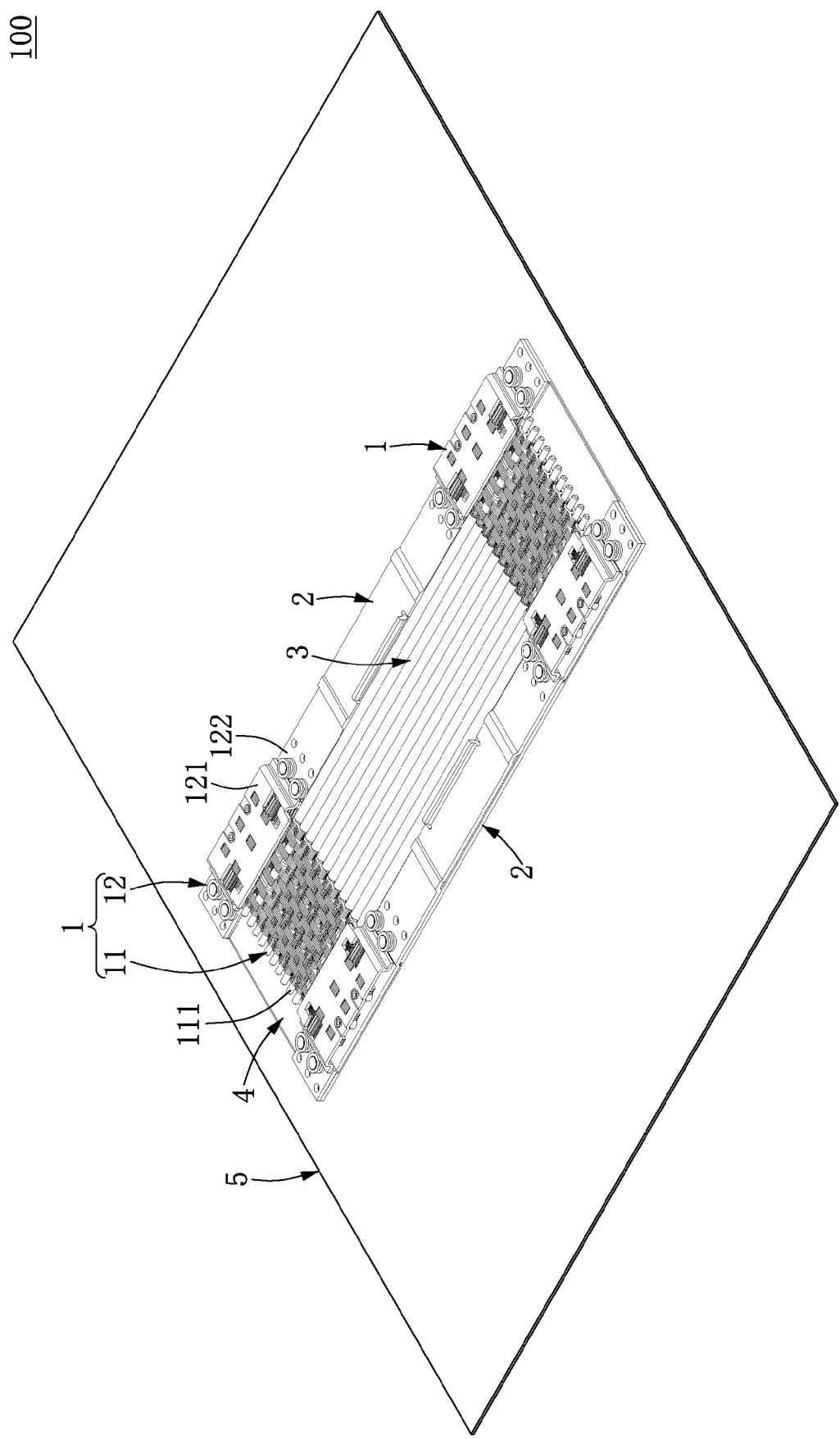
FIG. 1A is a perspective view showing a bendable display apparatus according to the instant disclosure.

Please refer to FIGS. 1A through 7, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Please refer to FIGS. 1A through 4, which show a bendable display apparatus 100 including two supporting devices 1, two connecting members 2, a plurality of connecting tubes 3, a carrying plate 4, and a soft display 5. The connecting members 2 and the connecting tubes 3 are configured to connect the two supporting devices 1. The carrying plate 4 is arranged on one side (i.e., the lower side shown in FIG. 1A) of the supporting devices 1, the connecting members 2, and the connecting tubes 3. The soft display 5 is disposed on the carrying plate 4. A portion of the soft display 5 corresponding in position to the supporting devices 1 and the connecting tubes 3 can be inwardly bent at 180 degrees (as shown in FIG. 2A) without suffering damage, but the instant disclosure is not limited thereto.

It should be noted that the movement of the bendable display apparatus 100 is a relative motion, but the figures are of a fixed part of the components for clearly showing the instant embodiment. Moreover, the supporting device 1 in the instant embodiment is applied to the bendable display apparatus 100, but the supporting device 1 can be applied to other apparatus.

The following description discloses the construction of each of the components of the bendable display apparatus 100, and then discloses the related features of the components of the bendable display apparatus 100. The two supporting devices 1 in the instant embodiment are substantially identical or symmetrical constructions, so the following description only illustrates one of the two supporting devices 1.

Figure 5:
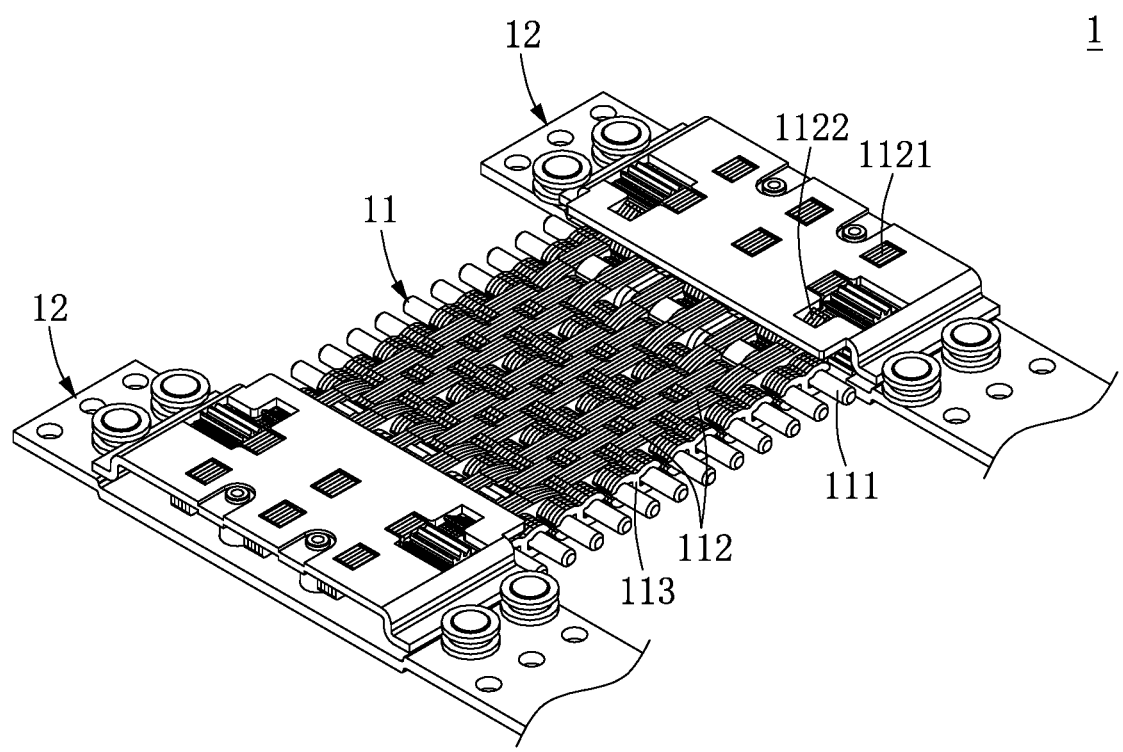
FIG. 5 is a perspective view showing a supporting device according to the instant disclosure.
Figure 6:
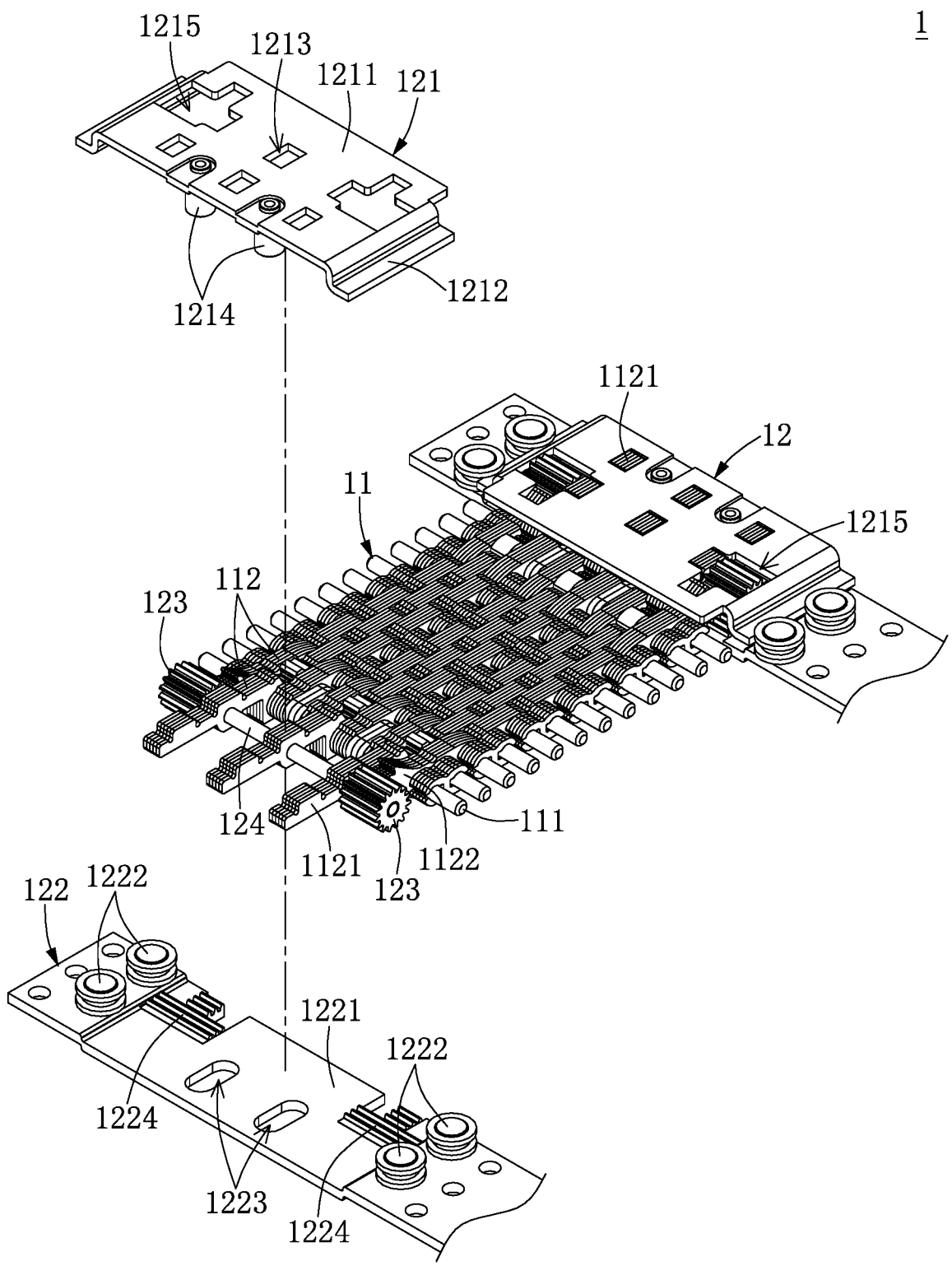
FIG. 6 is an exploded view of FIG. 5.

As shown in FIGS. 5 and 6, the supporting device 1 includes a hinge module 11 and two buffering modules 12 respectively installed on two opposite sides of the hinge module 11. The hinge module 11 in the instant embodiment has a maximum thickness of 2 mm. The hinge module 11 includes a plurality of pivots 111 parallel to each other and arranged in one row, a plurality of torsion units 112 sleeved at the pivots 111, and a plurality of connecting units 113. The pivots 111 in the instant embodiment are twelve rods, but the instant disclosure is not limited thereto. Each connecting unit 113 can be one sheet or a plurality of stacked sheets, and each connecting unit 113 is sleeved at two adjacent pivots 111 respectively inserted into two different torsion units 112.

The torsion unit 112 can be at least one of a gear, a plurality of stacked gear-plates, and a plurality of stacked washers. The torsion unit 112 can be sleeved at one of the pivots 111, two of the pivots 111, or three of the pivots 111. In the instant embodiment, the torsion units 112 are arranged in a plurality of rows, and any two adjacent torsion units 112 arranged in the same row are engaged with each other. Moreover, at least one of the rows has two elongated positioning potions 1121 arranged on two of the torsion units 112 thereof, and another row has two elongated driving portions 1122 arranged on two of the torsion units 112 thereof. In other words, the two positioning portions 1121 of the torsion units 112 in the same row are arranged away from each other, and the two driving portions 1122 of the torsion units 112 in the same row are arranged away from each other.

In the instant embodiment, the torsion units 112 each having the positioning potion 1121 and arranged in the same row are respectively sleeved at two of the pivots 111 respectively arranged at two ends of the row of the pivots 111, and the two positioning portions 1121 are arranged at two opposite sides of the row of the pivots 111. Specifically, the torsion units 112 of the instant embodiment have six positioning portions 1121 for respectively connecting the two buffering modules 12, but the instant disclosure is not limited thereto. Moreover, in one of any two adjacent rows of the torsion units 112, the torsion unit 112 provided without any positioning portion 1121 is sleeved at two adjacent pivots 111, in which the two adjacent pivots 111 are respectively inserted into two engaged torsion units 112 of the other row.

The driving portion 1122 in the instant embodiment is formed on one of the torsion units 112, and the torsion unit 112 having the driving portion 1122 is sleeved at three pivots 111, which are arranged from the outer side to the inner side of the row of the pivots 111. The driving portions 1122 in the instant embodiment are arranged outside the row of the pivots 111 for driving the two buffering modules 12. Moreover, the number of the pivots 111, which pass though the torsion unit 112 having the driving portion 1122, is more than that the number of the pivots 111, which pass though the torsion unit 112 without having the driving portion 1122, but the instant disclosure is not limited thereto.

Figure 1B:
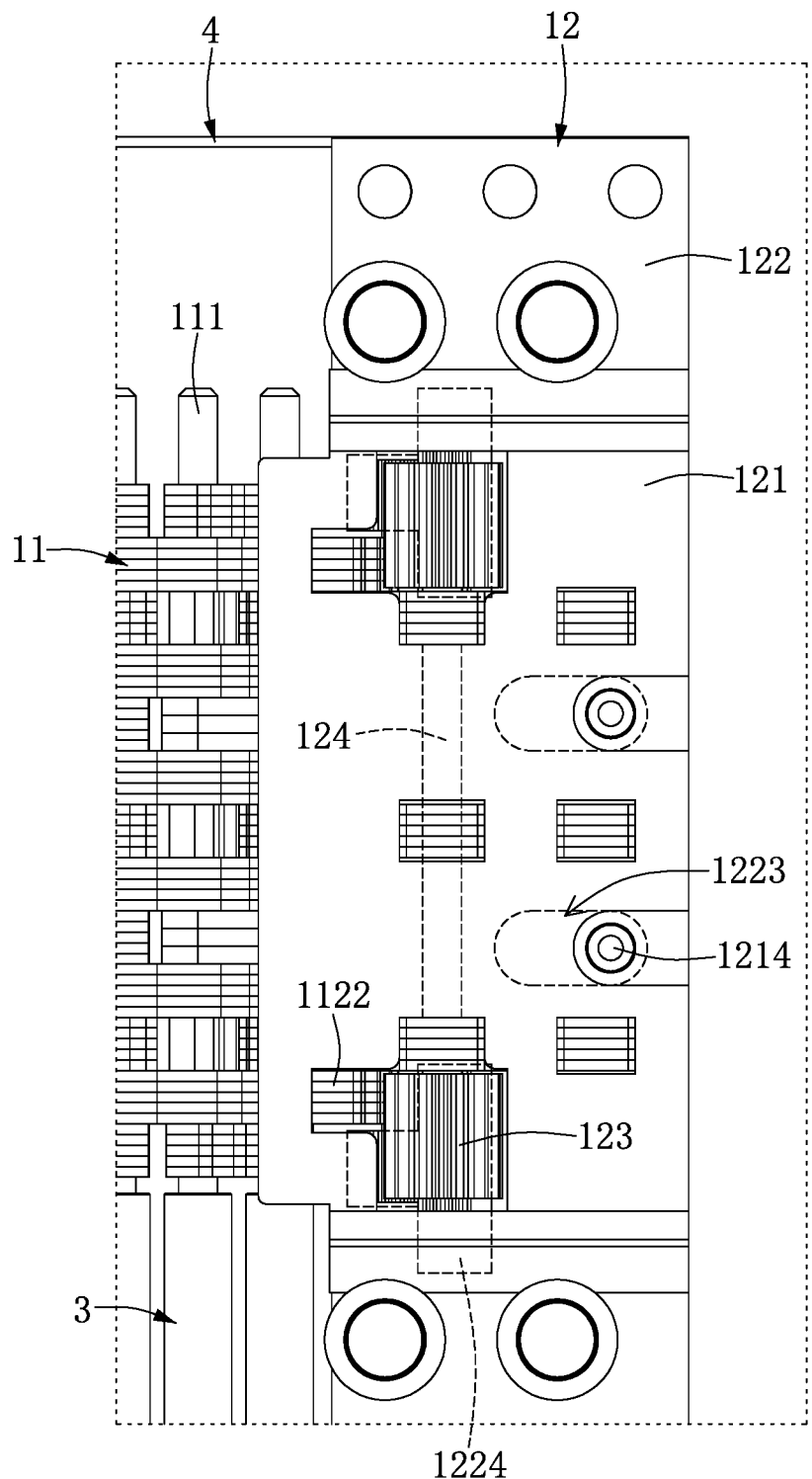
FIG. 1B is an enlarged view of FIG. 1A.
Figure 2A:
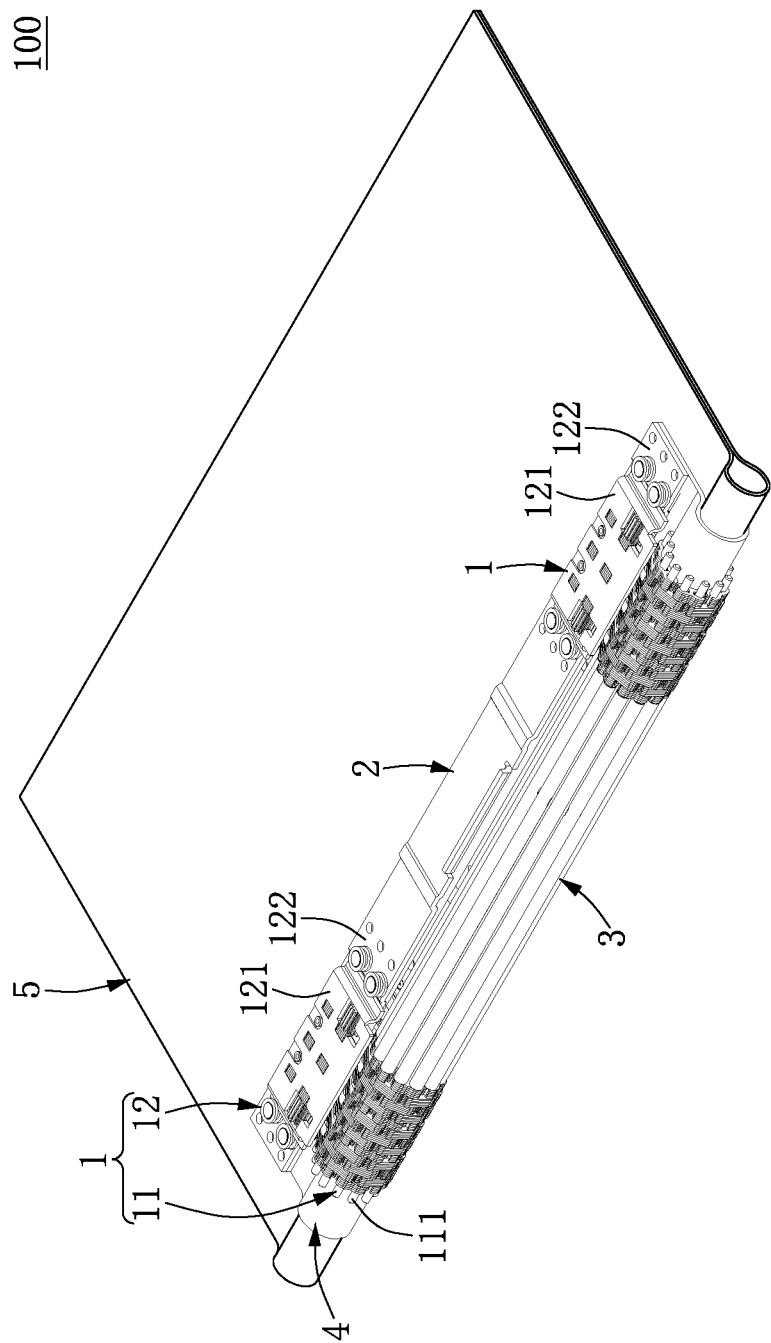
FIG. 2A is a perspective view showing the bendable display apparatus as inwardly being bent at 180 degrees.
Figure 2B:
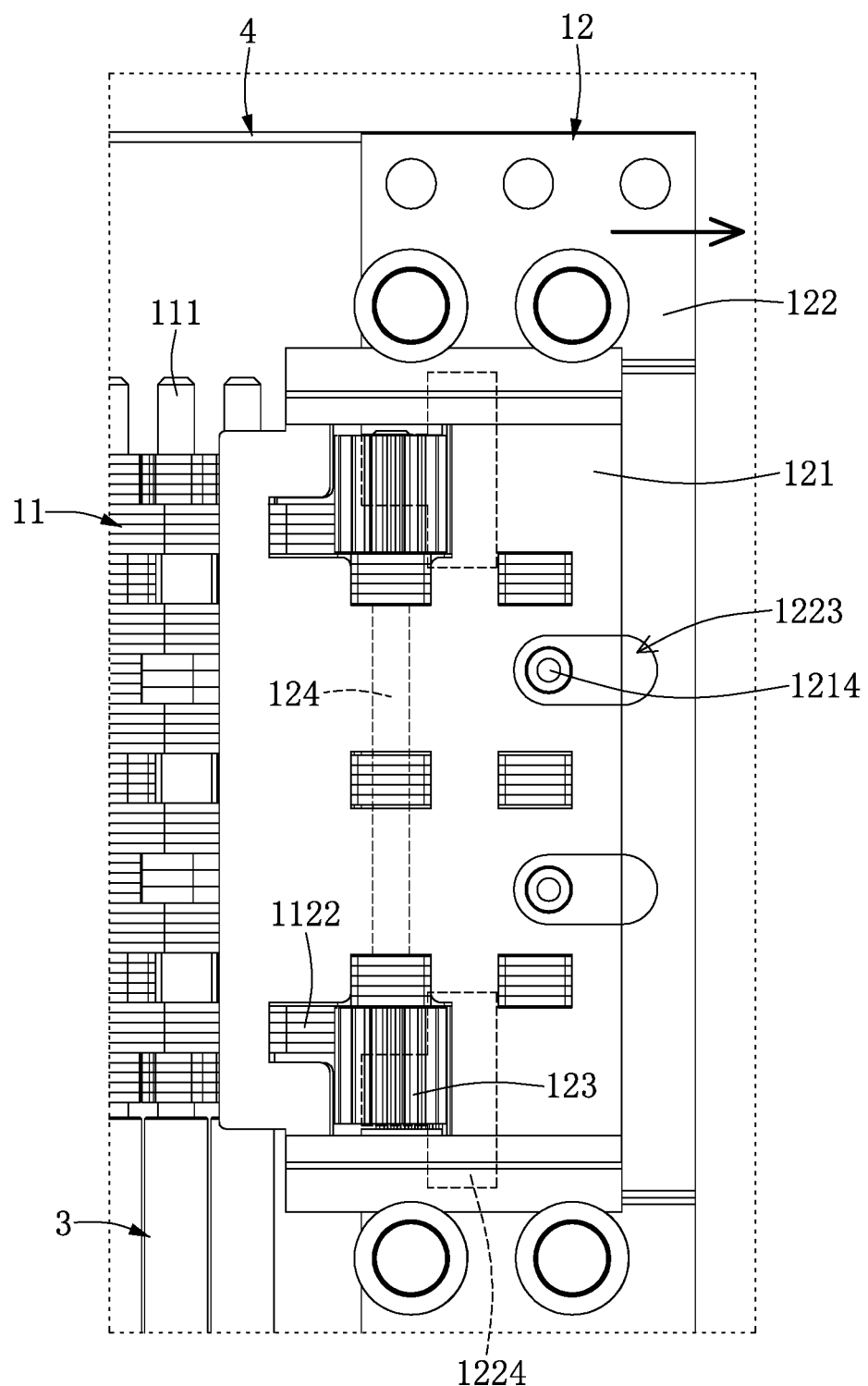
FIG. 2B is an enlarged view of FIG. 2A.

Thus, the hinge module 11 is bendable between an unfolded position (as shown in FIGS. 1A and 1B) and an inwardly folded position (as shown in FIGS. 2A and 2B) along at least one of the pivots 111, and the torsion units 112 are configured to stop the hinge module 11 at a desired position between the unfolded position and the inwardly folded position. When the hinge module 11 is at the unfolded position, the supporting device 1 is a flat construction. When the hinge module 11 is at the inwardly folded position, the supporting device 1 is a curved construction and most of an internal linking member 122 (which is disclosed in the following description) of each buffering module 12 is approximately arranged at the inner side of the curved construction. Specifically, as shown in FIGS. 2A and 2B, the inwardly folded position in the instant embodiment is defined by inwardly bending the hinge module 11 from the unfolded position at 180 degrees, but the instant disclosure is not limited thereto.

As shown in FIG. 5, the two buffering modules 12 are respectively arranged at two opposite sides of the pivots 111, and the two buffering modules 12 are respectively fixed on the positioning portions 1121 of the torsion units 112 and are respectively corresponding to the driving portions 1122. The two buffering modules 12 in the instant embodiment are substantially identical or symmetrical constructions, so the following description only illustrates one of the two buffering modules 12.

Figure 7:
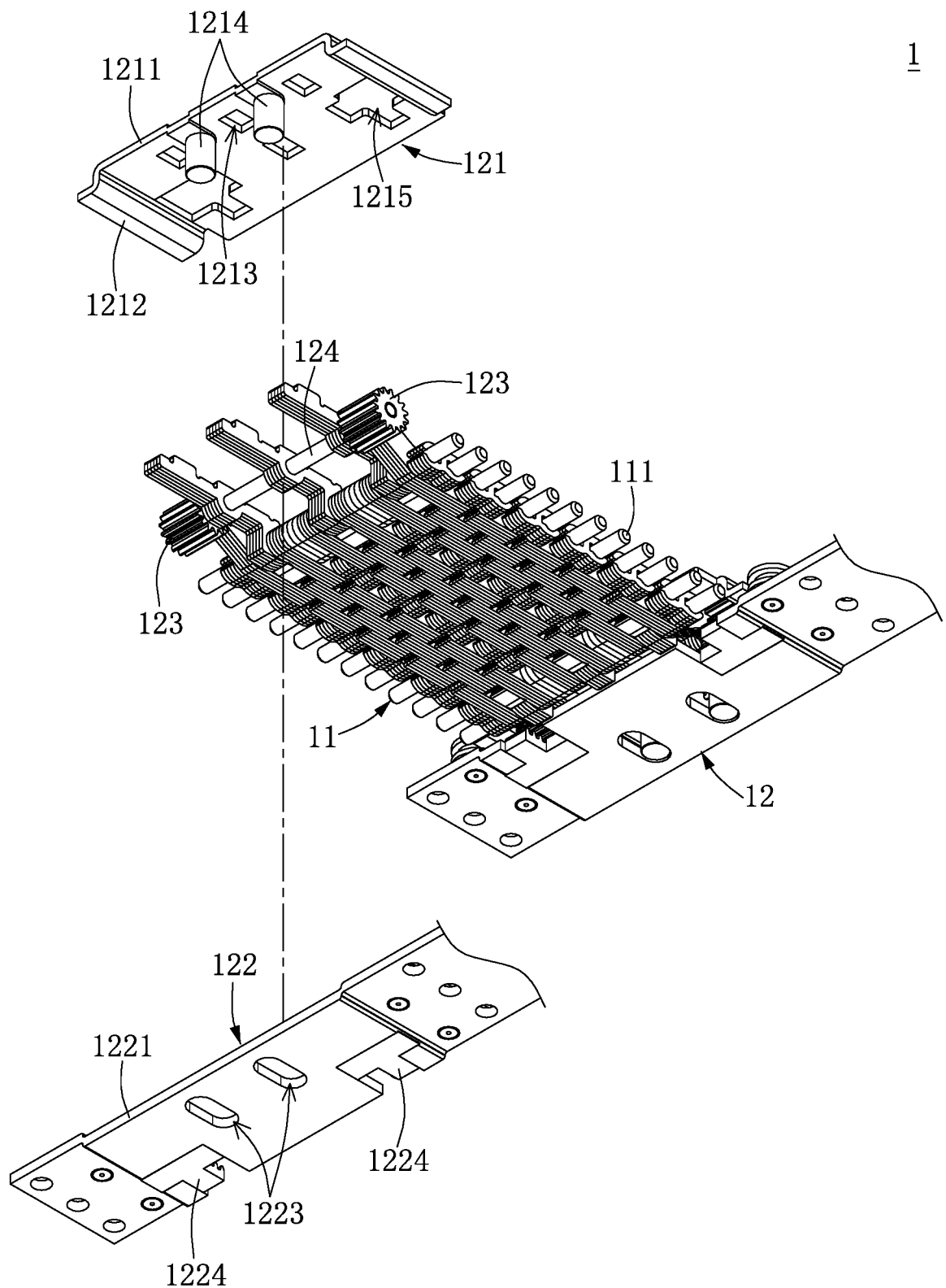
FIG. 7 is an exploded view of FIG. 5 from another perspective.

As shown in FIGS. 6 and 7, the buffering module 12 includes an external linking member 121 fixed on the corresponding positioning portions 1121, an internal linking member 122 movably disposed on the external linking member 121, two gears 123 each engaged with the internal linking member 122 and the corresponding driving portion 1122, and a pivoting rod 124 coupling through the corresponding positioning portion 1121 and pivotally connected to the two gears 123. The cooperation of the gear 123, the positioning portion 1121, and the internal linking member 122 is configured to maintain a predetermined moving path of the internal linking member 122 with respect to the external linking member 121.

Specifically, the external linking member 121 includes a plate 1211, two flanges 1212 curvedly extended from two opposite ends of the plate 1211 toward the carrying plate 4 (or the internal linking member 122), at least one fixing portion 1213 (i.e., an opening shown in FIG. 6) formed on the plate 1211, and at least one guiding pin 1214 fixed on the plate 1211. The number of the at least one fixing portion 1213 in the instant embodiment is equal to that of the corresponding positioning portion 1121, and the external linking member 121 is fixed on the hinge module 11 by using the at least one fixing portion 1213 to mount on the corresponding positioning portion 1121.

Figure 4:
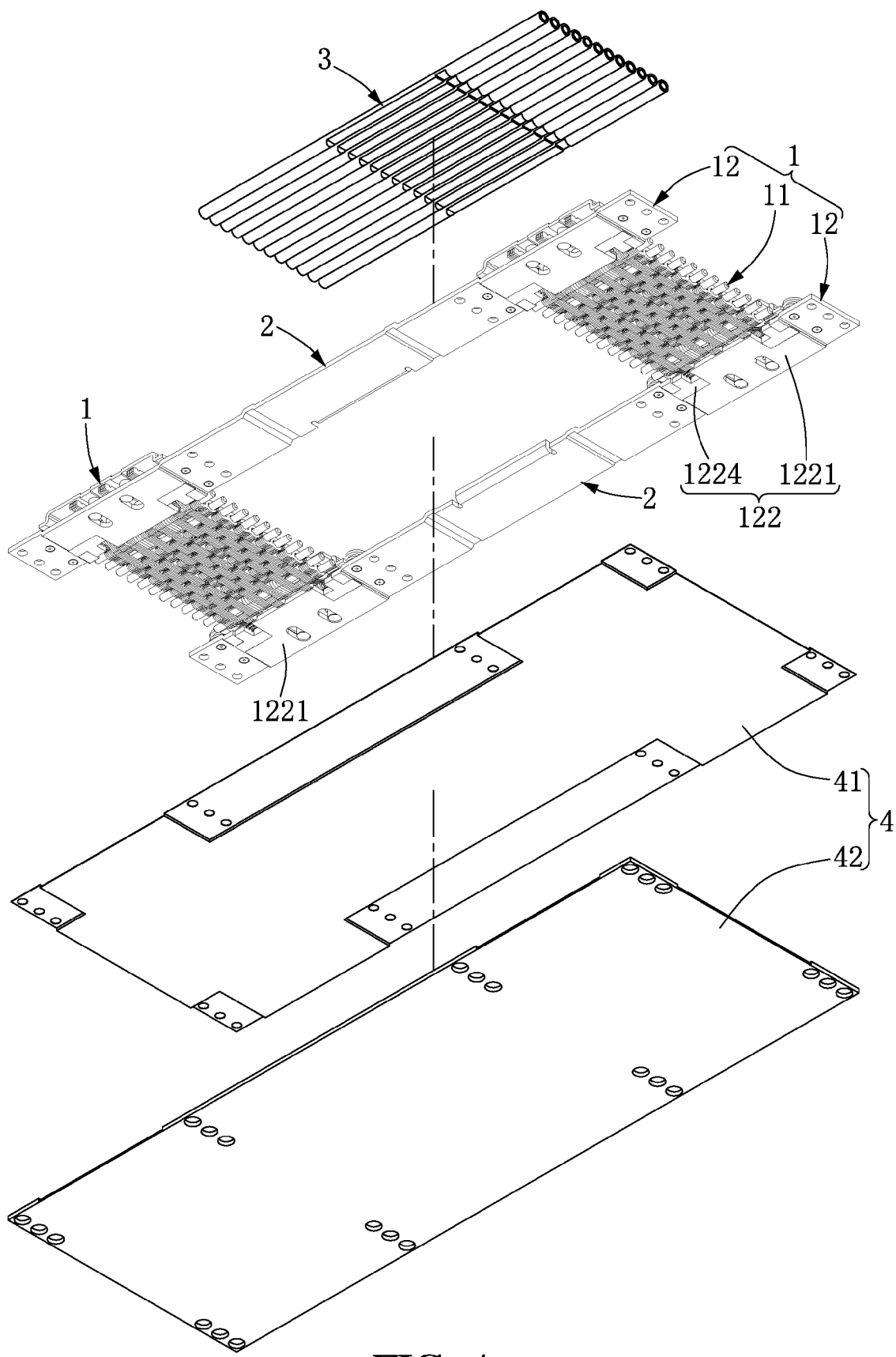
FIG. 4 is an exploded view of FIG. 1A from another perspective as omitting the soft display.

The internal linking member 122 includes a board 1221, a plurality of rollers 1222 (i.e., each end of the board 1221 is mounted with two rollers 1222), and two rack gears 1224 facing the external linking member 121. The board 1221 is fixed on the carrying plate 4 (as shown in FIG. 4), and the board 1221 has at least one elongated track 1223. The guiding pin 1214 of the external linking member 121 is inserted into the track 1223, and the guiding pin 1214 and the track 1223 are movable with respect to each other. The flanges 1212 of the external linking member 121 are respectively disposed on the rollers 1222, and the flanges 1212 and the rollers 1222 are movable with respect to each other.

Specifically, the plate 1211 of the external linking member 121 has two openings 1215 respectively formed on two opposite portions thereof (i.e., the top portion and the bottom portion of the plate 1211 shown in FIG. 6), and the two openings 1215 are respectively corresponding in position to the rack gears 1224. The gears 123 and the driving portions 1122 are exposed from the external linking member 121 via the openings 1215, and each opening 1215 is in air communication with one of the fixing portions 1213.

In addition, the cooperation of the external linking member 121 and the internal linking member 122 in the instant embodiment adapts to the two flanges 1212 and the corresponding rollers 1222, but the instant disclosure is not limited thereto. In a non-shown embodiment, the external linking member 121 can be provided with only one flange 1212, and the internal linking member 122 can be provided with at least one roller 1222 for carrying the flange 1212, or the external linking member 121 can be provided with only one rack gear 1224, and the supporting device 1 is provided with one gear 123 and one driving portion 1122 for cooperating with the rack gear 1224.

Each gear 123 is engaged with the corresponding driving portion 1122 and the corresponding rack gear 1224, so the two gears 123 are driven by the driving portions 1122 to respectively move the two rack gears 1224 of the internal linking member 122. Moreover, the two gears 123 and the two rack gears 1224 in each buffering module 12 can be regarded as two assemblies for cooperating with the two driving portions 1122, the two assemblies and the cooperated driving portions 1122 in the instant embodiment are substantially the identical or symmetrical constructions, so the following description only illustrates one assembly and the corresponding driving portion 1122. Specifically, the gear 123 in the instant embodiment is a spur gear, and the gear 123 is pivotally connected to the corresponding positioning portions 1121 by using the pivoting rod 124. A central axis of the gear 123 is preferably perpendicular to a longitudinal direction of the positioning portion 1121, but the instant disclosure is not limited thereto. In addition, in a non-shown embodiment, the buffering module 12 can be provided with one assembly of the gear 123 and the rack gear 1224 for cooperating with the corresponding driving portion 1122.

Thus, when the hinge module 11 of each supporting device 1 is bent (as shown in FIGS. 1B, 2B, 6, and 7), the driving portions 1122 of the hinge module 11 drive the gears 123 to rotate with respect to the positioning portions 1121 for moving the engaged rack gears 1224, such that the internal linking members 122 moves with respect to the external linking members 121.

In other words, when the hinge modules 11 of the two supporting devices 1 of the bendable display apparatus 100 are bent from the unfolded position (as shown in FIGS. 1A and 1B) toward the inwardly folded position (as shown in FIGS. 2A and 2B), for each buffering module 12, each gear 123 is driven by the corresponding driving portion 1122 to move the engaged rack gear 1224 of the internal linking member 122, such that the internal linking member 122 slides away from the pivots 111. The moving distance of the internal linking member 122 is preferably proportional to the bending angle of the hinge module 11, but the instant embodiment is not limited thereto.

When the supporting device 1 is bent from the inwardly folded position (as shown in FIGS. 2A and 2B) to the unfolded position (as shown in FIGS. 1A and 1B), each guiding pin 1214 is arranged at one of two opposite ends of the corresponding track 1223 (i.e., the outer end of the track 1223 shown in FIG. 1B), and each internal linking member 122 cannot move further away from the inwardly folded position (i.e., the supporting device 1 cannot be outwardly bent) by the cooperation between each guiding pin 1214 and the corresponding track 1223, such that the hinge module 11 can be maintained at the unfolded position. Moreover, when the supporting device 1 is bent from the unfolded position (as shown in FIGS. 1A and 1B) to the inwardly folded position (as shown in FIGS. 2A and 2B), each guiding pin 1214 is arranged at the other end of the corresponding track 1223 (i.e., the inner end of the track 1223 shown in FIG. 2B), and each internal linking member 122 cannot move further away from the unfolded position (i.e., the supporting device 1 cannot be further bent) due to the cooperation between each guiding pin 1214 and the corresponding track 1223, such that the hinge module 11 can be maintained at the inwardly folded position.

Figure 3:
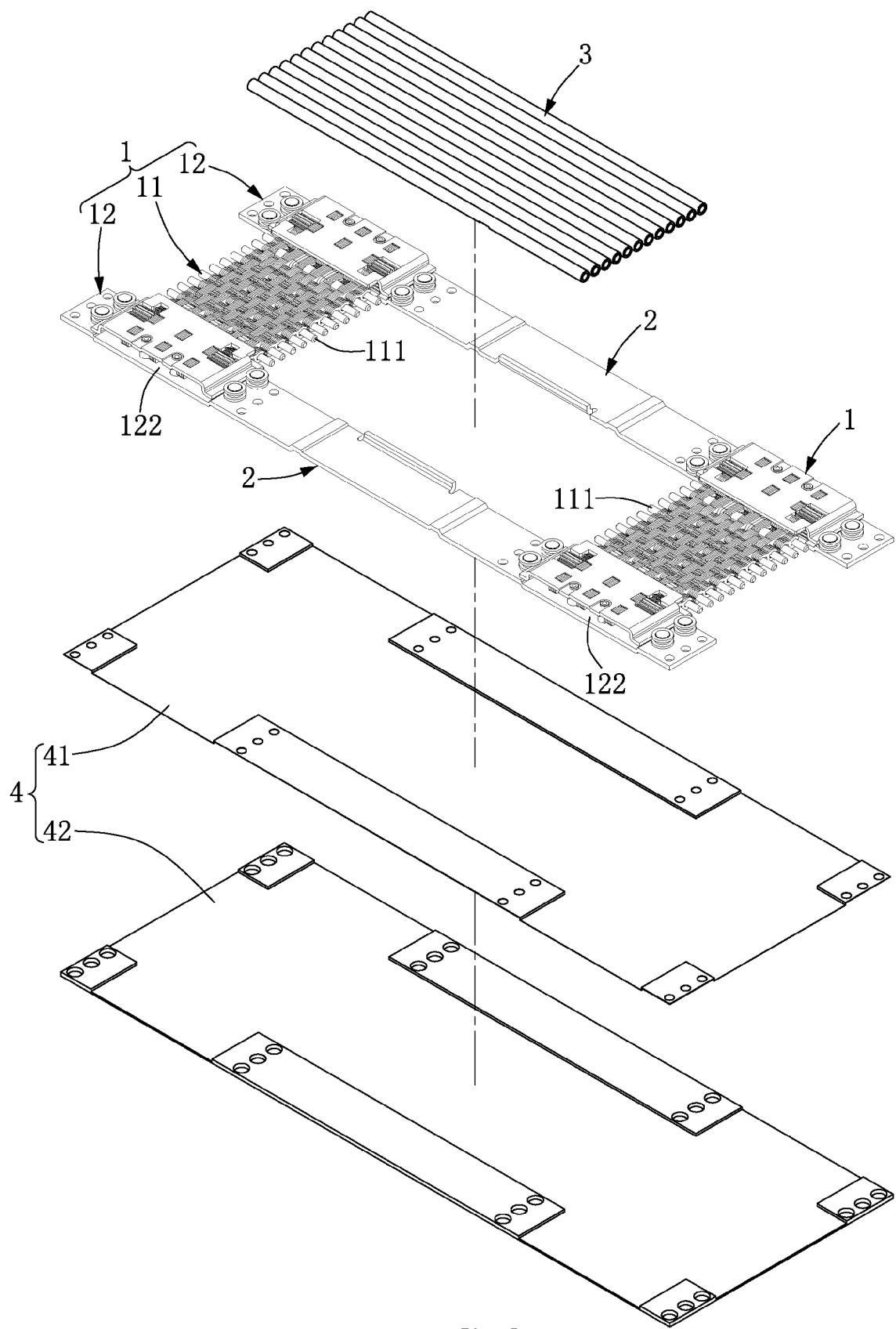
FIG. 3 is an exploded view of FIG. 1A as omitting the soft display.

As shown in FIGS. 3 and 4, each connecting member 2 is an elongated sheet. Two adjacent internal linking members 122 respectively arranged on the two supporting devices 1 (i.e., the upper left internal linking member 122 and the lower left internal linking member 122 as shown in FIG. 3) are connected by one of the two connecting members 2. The boards 1221 of the two adjacent internal linking members 122 respectively arranged on the two supporting devices 1 are integrally formed with the corresponding connecting member 2, but the instant disclosure is not limited thereto. Ends of the connecting tubes 3 (i.e., the top ends of the connecting tubes 3 shown in FIG. 3) are respectively sleeved at the pivots 111 of one of the two supporting devices 2, and the other ends of the connecting tubes 3 (i.e., the bottom ends of the connecting tubes 3 shown in FIG. 3) are respectively sleeved at the pivots 111 of the other supporting device 2. Thus, the two supporting devices 1 can be smoothly operated at the same time by using the connecting members 2 and the connecting tubes 3.

As shown in FIGS. 3 and 4, the carrying plate 4 is fixed on (the boards 1221 of) the internal linking members 122 of the two supporting devices 1. The carrying plate 4 includes a metal layer 41 and a cushion layer 42. The metal layer 41 is fixed on (the boards 1221 of) the internal linking members 122 of the two supporting devices 1, and the soft display 5 is mounted on the metal layer 41. The cushion layer 42 is disposed between the metal layer 41 and the soft display 5.

In addition, the soft display 5 in the instant embodiment is fixed on the carrying plate 4, but the instant disclosure is not limited thereto. In a non-shown embodiment, the soft display 5 can be directly fixed on (the boards 1221 of) the internal linking members 122 of the two supporting devices 1.

In summary, when the hinge modules 11 of the bendable display apparatus 100 are bent between the unfolded position and the inwardly folded position, the hinge modules 11 do not compress the soft display 5 (or the carrying plate 4) by moving the internal linking members 122 with respect to the external linking members 121. Thus, when the two supporting devices 1 support the soft display 5, the soft display 5 can be bent without suffering damage.

Moreover, when the bendable display apparatus 100 is at the unfolded position, the construction of each supporting device 1 is provided to block the hinge module 11 from moving away from the inwardly folded position, thereby preventing an outward bending from occurring to the soft display 5 (or the carrying plate 4).

In addition, when each hinge module 11 is at the inwardly folded position (as shown in FIG. 2A), each of the hinge modules 11 has a C-shaped construction, a portion of the soft display 5 corresponding in position to the hinge modules 11 and the connecting tubes 3 also has a C-shaped construction, and the other portions of the soft display 5 corresponding in position to the buffering modules 12 and the two connecting members 2 are parallel to each other.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A bendable display apparatus, comprising:
    two supporting devices each including:
        a hinge module including:
            a plurality of pivots parallel to each other and arranged in one row; and
            a plurality of torsion units sleeved at the pivots, wherein at least two positioning portions are respectively arranged on two opposite portions of the torsion units, and at least two driving portions are respectively arranged on two opposite portions of the torsion units; and
        two buffering modules respectively arranged at two opposite sides of the row of the pivots, respectively fixed on the at least two positioning portions, and respectively corresponding to the at least two driving portions, each of the two buffering modules including:
            an external linking member fixed on the corresponding positioning portion;
            an internal linking member movably disposed on the external linking member, wherein the internal linking member has at least one rack gear facing the external linking member; and
            at least one gear engaged with the at least one rack gear and the corresponding positioning portion;
    wherein in each of the two supporting devices, the hinge module is bendable between an unfolded position and an inwardly folded position along at least one of the pivots, and the torsion units stopping the hinge module at a desired position between the unfolded position and the inwardly folded position; when the hinge module is at the unfolded position, the supporting device is a flat construction; when the hinge module is at the inwardly folded position, the supporting device is a curved construction and the internal linking members are approximately arranged at the inner side of the curved construction;
    wherein in each of the hinge modules, when the hinge module is bent from the unfolded position toward the inwardly folded position, the at least one gear is driven by the corresponding driving portion to move the at least one rack gear of the internal linking member away from the pivots;
    a carrying plate fixed on the internal linking members of the two supporting devices; and
    a soft display mounted on the carrying plate.

2. The bendable display apparatus as claimed in claim 1, wherein in each of the buffering modules, the at least one gear is a spur gear and is pivotally connected to the corresponding positioning portion, a central axis of the gear is perpendicular to a longitudinal direction of the corresponding positioning portion.

3. The bendable display apparatus as claimed in claim 1, wherein when each of the hinge modules is at the inwardly folded position, each of the hinge modules has a C-shaped construction, a portion of the soft display corresponding in position to the hinge modules has a C-shaped construction, and the other portions of the soft display corresponding in position to the buffering modules are parallel to each other.

4. The bendable display apparatus as claimed in claim 1, wherein in each of the buffering modules, the external linking member has an opening corresponding in position to at least part of the at least one gear, and the at least one gear and the engaged driving portion are exposed from the external linking member via the opening.

5. The bendable display apparatus as claimed in claim 1, wherein in each of the buffering modules, the internal linking member includes a plurality of rollers, the external linking member has at least one flange disposed on the rollers, and the rollers and the at least one flange are movable with respect to each other.

6. The bendable display apparatus as claimed in claim 1, wherein in each of the buffering modules, the internal linking member includes a track, the external linking member includes a guiding pin inserted into the track, the guiding pin and the track are movable with respect to each other, wherein when the guiding pin is arranged at one of two opposite ends of the track, the corresponding hinge module is maintained at the unfolded position, and when the guiding pin is arranged at the other end of the track, the corresponding hinge module is maintained at the inwardly folded position.

7. The bendable display apparatus as claimed in claim 1, further comprising two connecting members and a plurality of connecting tubes, wherein two adjacent internal linking members respectively arranged on the two supporting devices are integrally connected to one of the connecting members, ends of the connecting tubes are respectively sleeved at the pivots of one of the two supporting devices, and the other ends of the connecting tubes are respectively sleeved at the pivots of the other supporting device.

8. The bendable display apparatus as claimed in claim 1, wherein the at least two driving portions are respectively formed on at least two of the torsion units, and each of the torsion units having the driving portion is sleeved at three of the pivots.

9. The bendable display apparatus as claimed in claim 8, wherein the three pivots passing through the torsion unit having the driving portion are arranged from the outer side to the inner side of the row of the pivots, wherein the number of the pivots passing though the torsion unit having the driving portion is more than the number of the pivots passing though the torsion unit without having the driving portion.

10. The bendable display apparatus as claimed in claim 1, wherein in each of the two supporting devices, the number of the at least two driving portions is four, and the four driving portions are respectively corresponding to the two buffering modules, the number of the at least one gear of each of the buffering modules is two, and the two gears of each of the buffering modules are respectively engaged to the two corresponding driving portions, wherein in each of the buffering modules the number of at least one rack gear is two, and the two rack gears are respectively engaged with the two gears.

11. The bendable display apparatus as claimed in claim 10, wherein each of the buffering modules includes a pivoting rod coupling through the corresponding positioning portion, wherein in each of the buffering modules, each of the gears is a spur gear and is pivotally connected to the corresponding positioning portion, a central axis of each of the gears is perpendicular to a longitudinal direction of the corresponding positioning portion.

12. A supporting device, comprising:
a hinge module including:
  a plurality of pivots parallel to each other and arranged in one row; and
  a plurality of torsion units sleeved at the pivots, wherein at least two positioning portions are respectively arranged on two opposite portions of the torsion units, and at least two driving portions are respectively arranged on two opposite portions of the torsion units; and
two buffering modules respectively arranged at two opposite sides of the row of the pivots, respectively fixed on the at least two positioning portions, and respectively corresponding to the at least two driving portions, each of the two buffering modules including:
  an external linking member fixed on the corresponding positioning portion;
  an internal linking member movably disposed on the external linking member, wherein the internal linking member has at least one rack gear facing the external linking member;
  at least one gear engaged with the at least one rack gear and the corresponding portion;
wherein the hinge module is bendable between an unfolded position and an inwardly folded position along at least one of the pivots, and the torsion units stopping the hinge module at a desired position between the unfolded position and the inwardly folded position; when the hinge module is at the unfolded position, the supporting device is a flat construction; when the hinge module is at the inwardly folded position, the supporting device is a curved construction and the internal linking members are approximately arranged at the inner side of the curved construction; wherein when the hinge module is bent from the unfolded position toward the inwardly folded position, the at least one gear is driven by the corresponding driving portion to move the at least one rack gear of the internal linking member away from the pivots.

13. The supporting device as claimed in claim 12, wherein in each of the buffering modules, the at least one gear is a spur gear and is pivotally connected to the corresponding positioning portion, a central axis of the gear is perpendicular to a longitudinal direction of the corresponding positioning portion.

14. The supporting device as claimed in claim 12, wherein in each of the buffering modules, the external linking member has an opening corresponding in position to at least part of the at least one gear, and the at least one gear and the engaged driving portion are exposed from the external linking member via the opening.

15. The supporting device as claimed in claim 12, wherein in each of the buffering modules, the internal linking member includes a plurality of rollers, the external linking member has at least one flange disposed on the rollers, and the rollers and the at least one flange are movable with respect to each other.

16. The supporting device as claimed in claim 12, wherein in each of the buffering modules, the internal linking member includes a track, the external linking member includes a guiding pin inserted into the track, the guiding pin and the track are movable with respect to each other, wherein when the guiding pin is arranged at one of two opposite ends of the track, the corresponding hinge module is maintained at the unfolded position, and when the guiding pin is arranged at the other end of the track, the corresponding hinge module is maintained at the inwardly folded position.

17. The supporting device as claimed in claim 12, wherein the at least two driving portions are respectively formed on at least two of the torsion units, and each of the torsion units having the driving portion is sleeved at three of the pivots.

18. The supporting device as claimed in claim 17, wherein the three pivots passing through the torsion unit having the driving portion are arranged from the outer side to the inner side of the row of the pivots, wherein the number of the pivots passing though the torsion unit having the driving portion is more than the number of the pivots passing though the torsion unit without having the driving portion.

19. The supporting device as claimed in claim 12, wherein the number of the at least two driving portions is four, and the four driving portions are respectively corresponding to the two buffering modules, the number of the at least one gear of each of the buffering modules is two, and the two gears of each of the buffering modules are respectively engaged to the two corresponding driving portions, wherein in each of the buffering modules the number of the at least one rack gear is two, and the two rack gears are respectively engaged with the two gears.

20. The supporting device as claimed in claim 19, wherein each of the buffering modules includes a pivoting rod coupling through the corresponding positioning portion, wherein in each of the buffering modules, each of the gears is a spur gear and is pivotally connected to the corresponding positioning portion, a central axis of each of the gears is perpendicular to a longitudinal direction of the corresponding positioning portion.

* * * * *